United States Patent [19]
Kawai

[11] Patent Number: 6,018,599
[45] Date of Patent: *Jan. 25, 2000

[54] COLOR IMAGE READING APPARATUS

[75] Inventor: Takashi Kawai, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/371,443

[22] Filed: Jan. 11, 1995

Related U.S. Application Data

[63] Continuation of application No. 07/967,427, Oct. 28, 1992, abandoned.

[30] Foreign Application Priority Data

Oct. 29, 1991 [JP] Japan ................................. 3-282973

[51] Int. Cl.[7] .................................................. H04N 1/58
[52] U.S. Cl. .......................... 382/274; 358/504; 358/516; 358/524
[58] Field of Search .................................... 358/500, 504, 358/515, 516, 518, 523, 524, 461; 382/167, 162, 274; H04N 1/58

[56] References Cited

U.S. PATENT DOCUMENTS

| | | | |
|---|---|---|---|
| 4,853,768 | 8/1989 | Suzuki et al. | 358/517 |
| 4,979,027 | 12/1990 | Sakai | 358/530 |
| 5,032,903 | 7/1991 | Suzuki et al. | 358/75 |
| 5,060,061 | 10/1991 | Shisido et al. | 358/527 |
| 5,185,658 | 2/1993 | Itagaki et al. | 358/518 |
| 5,237,401 | 8/1993 | Koike et al. | 358/518 |
| 5,414,535 | 5/1995 | Kanmoto et al. | 358/504 |

FOREIGN PATENT DOCUMENTS

63-124665 5/1988 Japan .

Primary Examiner—Kim Yen Vu
Attorney, Agent, or Firm—Fitzpatrick, Cella, Harper & Scinto

[57] ABSTRACT

When a color film original is read, a shading correction or the like is executed without using a color base film. An apparatus has: an RAM 115 in which output ratios of RGB signals from an RGB sensor (CCD) 106 for an unexposed portion of a color film have previously been stored; an amplifier 107 to amplify the signals from the CCD line sensor 106 by gains based on the RGB signal output ratios from the RAM 115 without transmitting through the base film when shading correction data is read; and a shading correction circuit 110 to give the shading correction data to an RAM 111 on the basis of outputs of the amplifier 107.

28 Claims, 6 Drawing Sheets

COLOR IMAGE READING APPARATUS

This application is a continuation, of application Ser. No. 07/967,427 filed Oct. 28, 1992, now abandoned.

BACKGROUND OF THE INVENTION

1. Field of the Invention

The present invention relates to a color image reading apparatus and, more particularly, to a color image reading apparatus having the function of performing a shading correction.

2. Related Background Art

Hitherto, a color film input apparatus using a line sensor such as a CCD or the like has been known as a color image reading apparatus which reads a color film and performs a certain signal conversion and, thereafter, obtains image information.

The inputting operation by the color film input apparatus will now be described with respect to the case of inputting a color negative film as a positive image as an example hereinbelow.

Generally, the color negative film has been subjected to a process called an orange mask and a negative image is recorded on an orange film. That is, the color negative film has an orange color in an unexposed portion and each pigment develops the color on the orange in an exposed portion.

In the conventional color film input apparatus, to remove the orange component from the color separation signals of three primary colors, namely, RGB (Red, Green, Blue) of a negative image as an original, a color negative film (hereinafter, referred to as a color base film or base film) which is not exposed and is the same kind as the original is prepared, the light transmitted through the base film is projected onto a sensor prior to reading the original film and a transmission concentration of the base film is read and stored into a memory such as an RAM or the like (hereinafter, the base film read signal is called shading correction data).

From the shading correction data, the orange component in the negative film is eliminated and a sensitivity variation of the CCD sensor and a light amount distribution variation of an original illuminating light source are also corrected.

There is also an apparatus in which after the shading correction data is read, the base film is replaced with an original film of an image to be read, the original film is projected by a light source and scanned and read by a CCD sensor, the image data and shading correction data are arithmetically process, and the read image of the original film is corrected (Japanese Laid-Open Patent Application No. 63-124665).

In the above conventional apparatus, however, each time the color negative film is read, in addition to the original film, a color base film of the same maker and the same kind as those of the original film must be prepared.

On the other hand, each time the color negative film is read, a troublesome operation to read the color base film is needed as a pre-process. Further, there is a drawback in that the film is bleached by the repetitive exposure or aging change of the color base film.

SUMMARY OF THE INVENTION

It is, therefore, an object of the invention to provide a color image reading apparatus which can solve the above problems.

Another object of the invention is to provide a color image reading apparatus which does not need to use a base film.

According to the invention, to accomplish the above objects, there is disclosed a color image reading apparatus comprising: converting means for converting an original of a color film into a plurality of color component signals; memory means in which signals corresponding to a plurality of color component signals which will be obtained from an unexposed portion of the color film have previously been stored without being subjected to the conversion by the converting means; and correcting means for correcting the color component signals converted by the converting means by using the signals stored in the memory means.

Still another object of the invention is to provide a film reader having an excellent operating performance.

A further object of the invention is to provide a color image reading apparatus having an excellent high-speed processing performance.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

(First Embodiment)

Figure 1:
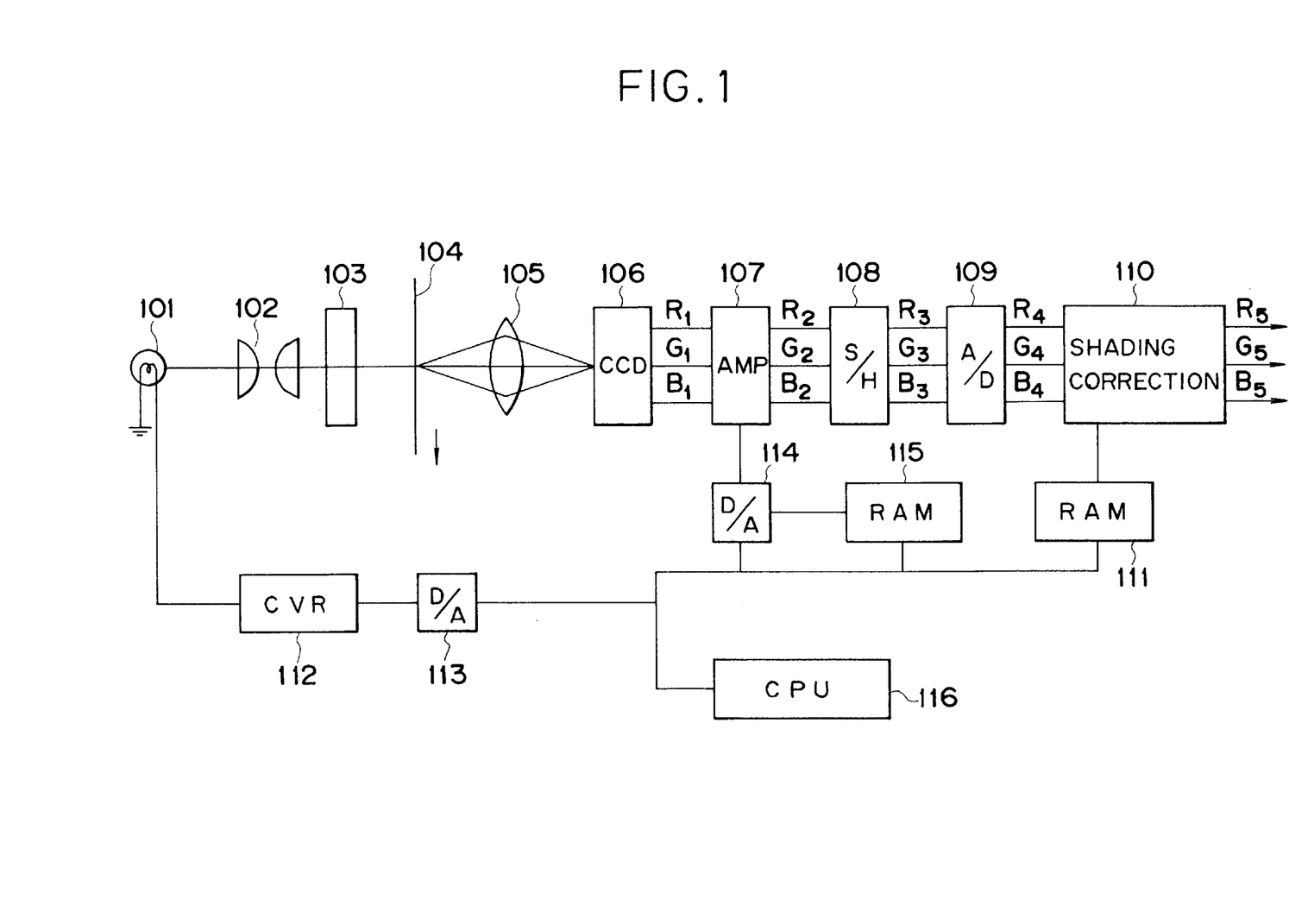
FIG. 1 is a block diagram of the first embodiment of the invention.

FIG. 1 shows the first embodiment of the invention.

In FIG. 1, reference numeral 101 denotes a halogen electric bulb as a light source to transmission illuminate a film; 102 a condenser lens to convert the light from the light source into a parallel light flux; 103 a color correction filter to correct the color balance; 104 a color film original as an original to be read; 105 an image forming lens to form a film image; and 106 a photoelectric converting device for color separating the formed film image into three primary colors (R, G, B) and converting them into the electric signals. For instance, a CCD line sensor coated with filters of three primary colors (R, G, B) may be used. Reference numeral 107 denotes an amplifying circuit to individually amplify CCD outputs of R, G, and B in an analog manner; 108 a sample and hold circuit to sample and hold the analog outputs; 109 an A/D converter to A/D convert analog outputs of the S/H circuit 108 into digital signals; 110 a shading correction circuit for correcting a sensitivity variation of each device of the CCD 106 and an illumination variation of the light source and for allocating image data to a specified number of bits; 111 a shading RAM to hold the shading correction data for shading correction line by line with respect to each of R, G, and B; 112 and 113 a constant voltage power source and a D/A converter for controlling a turn-on voltage of the light source 101 by a CPU 116; 114 a D/A converter to independently control an amplification factor of the amplifier 107 with respect to each of R, G, and B; and 115 an RAM to store the amplification factors. The CPU 116 is connected to the above component elements 113, 114, 115, and 111 by a bus and transfers data to them. The reading operation of a negative color film by the above construction will now be described with reference to FIG. 3.

Figure 3:
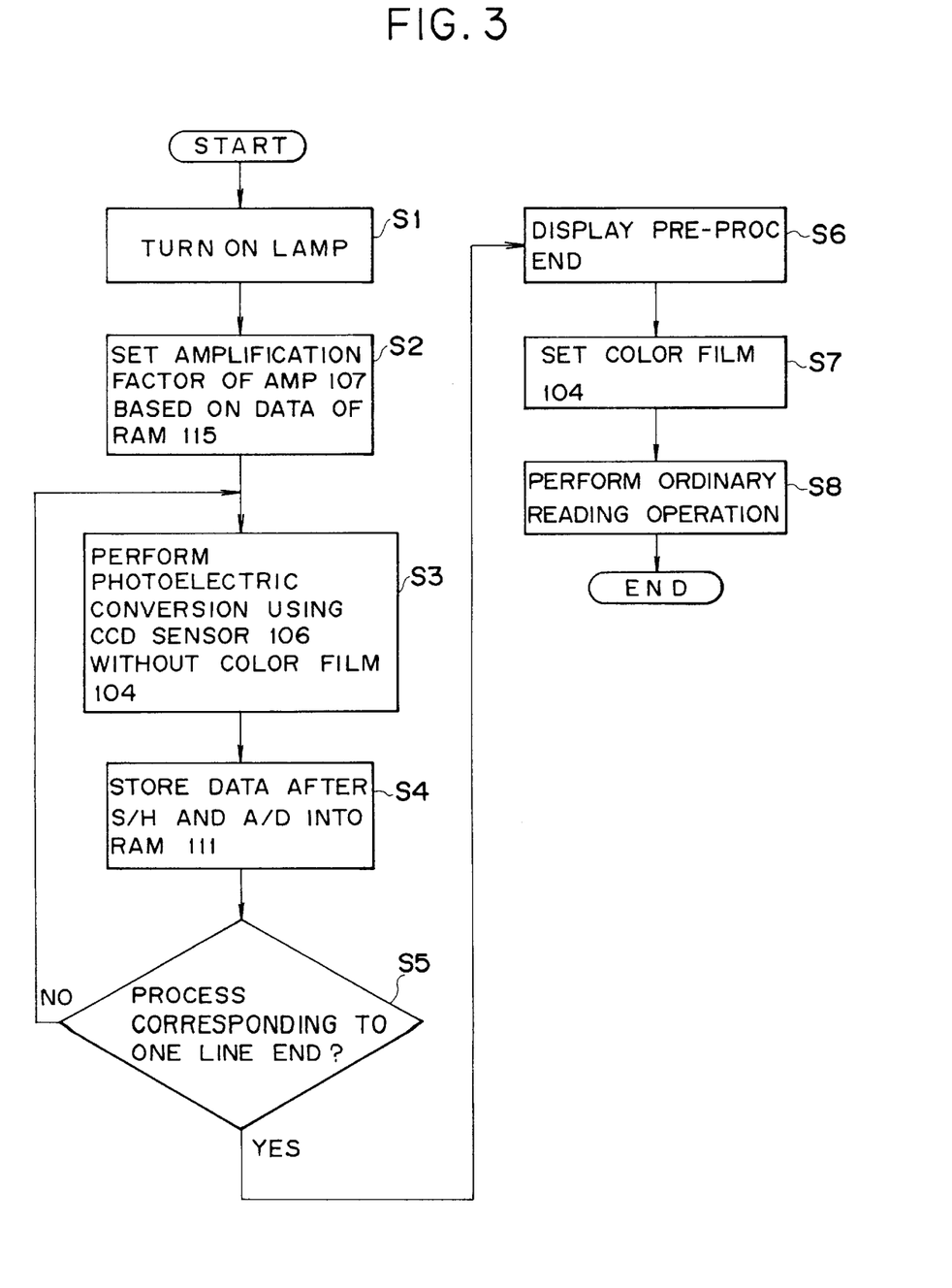
FIG. 3 is a flowchart showing a procedure of the first embodiment of the invention.

First, the shading correction data is read prior to reading the film original 104. To read the shading correction data, the lamp is turned on in a state in which the film is not arranged on the optical path (a state in which the color film original 104 in FIG. 1 is not present) (step S1). The electrophotographic conversion is executed by the CCD sensor 106 (S3).

As mentioned above, since the color correction filter 103 for obtaining the color balance is inserted in the reading system as mentioned above when the film is not present on the optical path, the CCD 106 generates the signals in an RGB unbalanced state. RGB output ratios of the color base film have previously been stored in the RAM 115. When the shading correction data is read, the amplification factors of R, G, and B are set in the amplifier 107 on the basis of the RGB output ratios read out from the RAM 115 (S2). As output values $R_2$, $G_2$, and $B_2$ of the amplifier 107, the same values as the read outputs which will be derived on the assumption that the base film is read are obtained. The output values are sampled and held by the sample and hold circuit 108. Output signals $R_3$, $G_3$, and $B_3$ of the S/H circuit 108 are converted into digital data $R_4$, $G_4$, and $B_4$ by the A/D converter 109. The digital data $R_4$, $G_4$, and $B_4$ are subsequently stored into the shading RAM 111 as shading correction data $R_5$, $G_5$, and $B_5$(S4). The reading operation of the shading correction data is finished in this manner. The above processes are similarly executed with respect to all of the pixels of one line (S5). After completion of the reading operation of one line, a message indicative of the end of storage of the shading correction data as a pre-process is displayed on a display panel of an operating section (not shown).

The film original 104 is set onto the optical path (S7). The amplification factors of the amplifier 107 are set so as to obtain a color balance in a state in which the color film is present. The image information is read. The shading correction is subsequently executed by a well-known method. The reading of the color image original is finished (S8).

Figure 4:
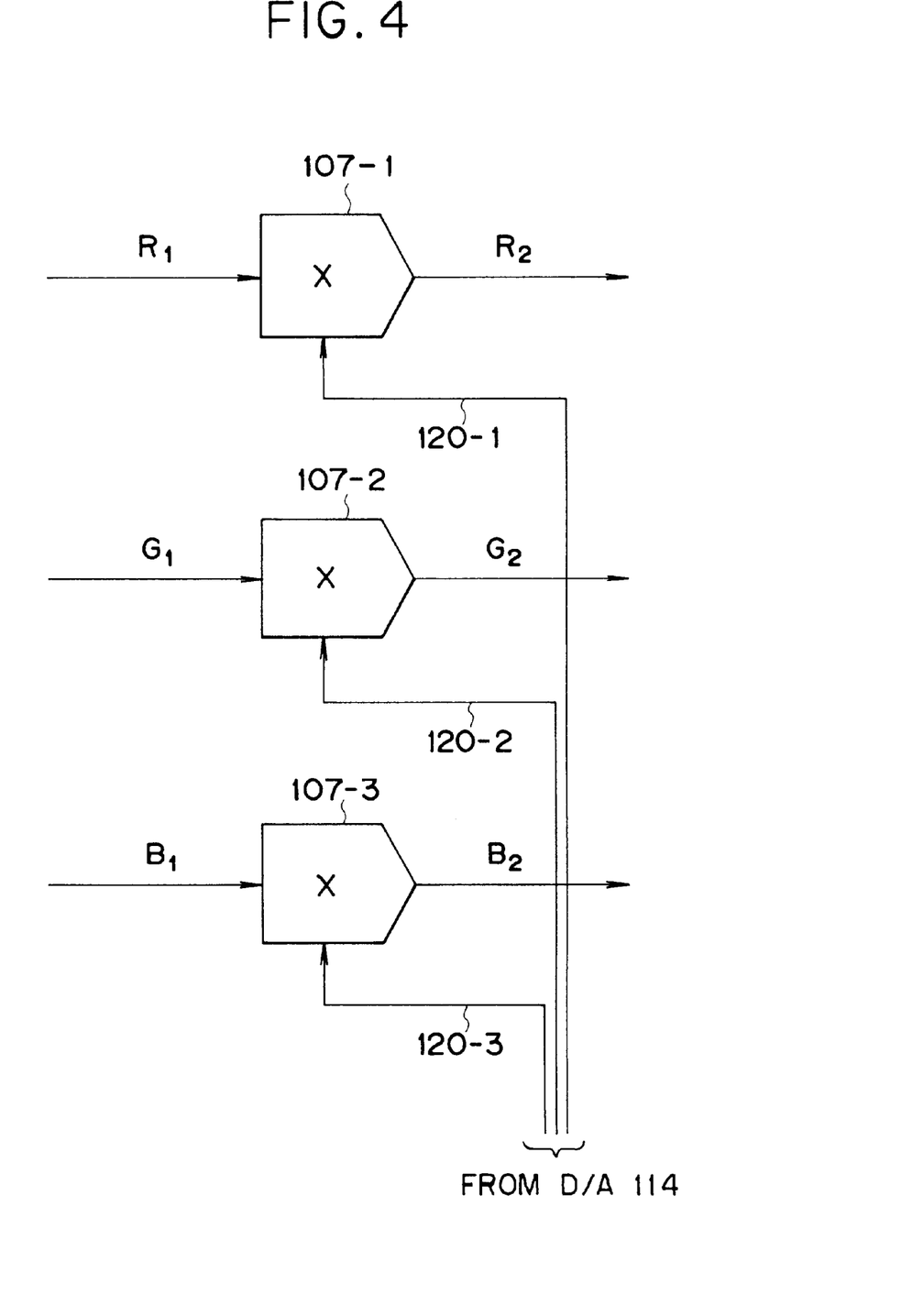
FIG. 4 is a diagram showing a construction of an amplifier 107.

FIG. 4 is a diagram showing a construction of the amplifier 107. Reference numerals 107-1 to 107-3 denote multipliers. In the pre-process, values 120-1 to 120-3 according to the base concentrations (concentrations which will be obtained when the base film is read) stored in the RAM 115 as mentioned above are multiplied to the input image data $R_1$, $G_1$, and $B_1$ by the multipliers 107-1 to 107-3.

On the other hand, in the ordinary process, the multiplication coefficient is set to 1 so as to provide a through state.

Figure 5:
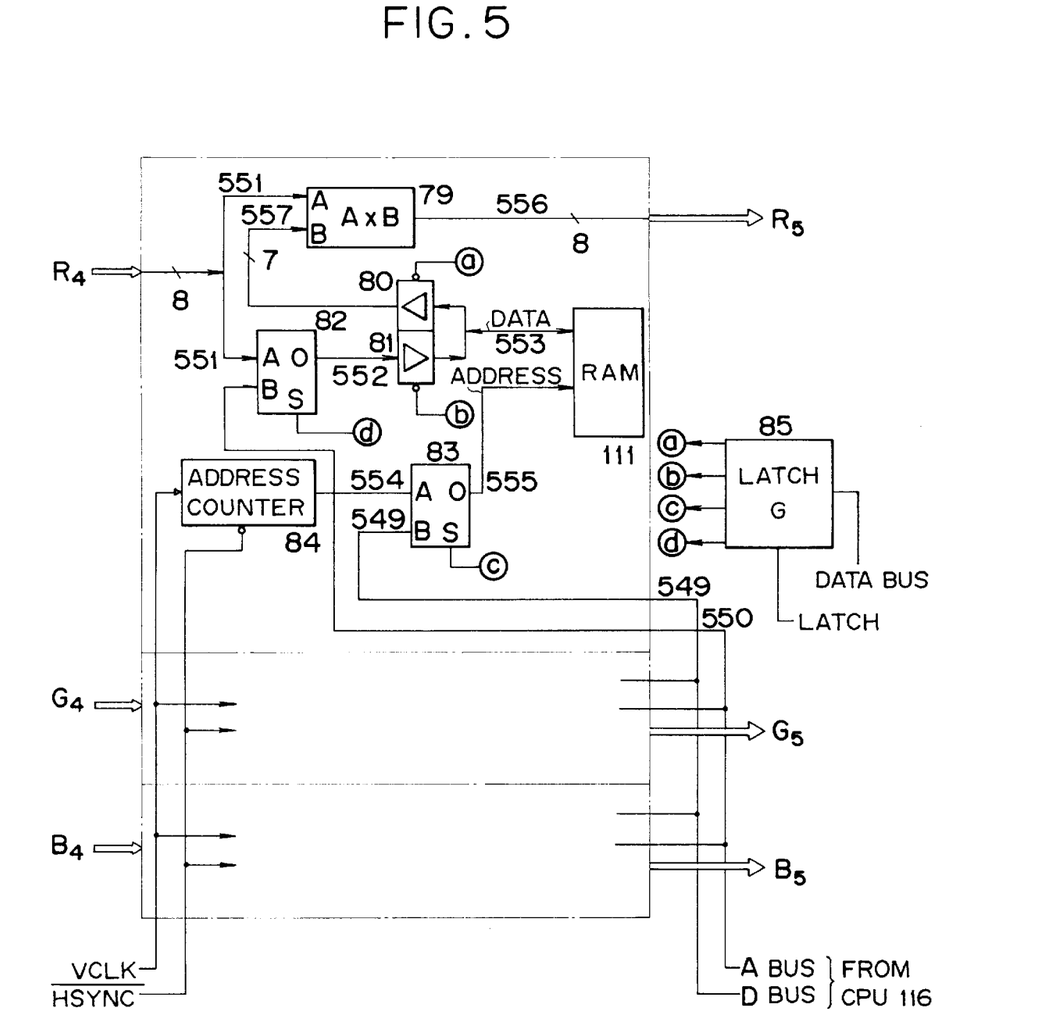
FIG. 5 is a diagram showing a construction of a shading correction circuit 110.

FIG. 5 is a diagram showing a construction of the shading correction circuit 110.

First, when the shading correction data is read, in order to store the input $R_4$ data of eight bits into the RAM 111, a selection signal is set into a latch 85 by the data bus. That is, the A side is selected by a selector 82 ((d)). A gate 80 is closed ((a)). A gate 81 is opened ((b)). Namely, data lines are connected in accordance with the order of 551→552→553. On the other hand, the A side is selected by a selector 83 ((c)) so that an output of an address counter 84 which is initialized by a signal $\overline{HSYNC}$ is supplied to an address input of the RAM.

In the ordinary image process, the RAM 111 is set into the data reading mode. The shading correction data is sent to a multiplier 79 every pixel along a path of data lines 553→557.

In this instance, the gate 81 is closed ((b)) and the gate 80 is opened ((a)). The B side of each of the selectors 82 and 83 is used in case of directly writing the shading correction data into the RAM 111 by the CPU 116.

As mentioned above, the proper shading correction can be executed in consideration of the base concentration of the film without using the base film.

(Second Embodiment)

Figure 2:
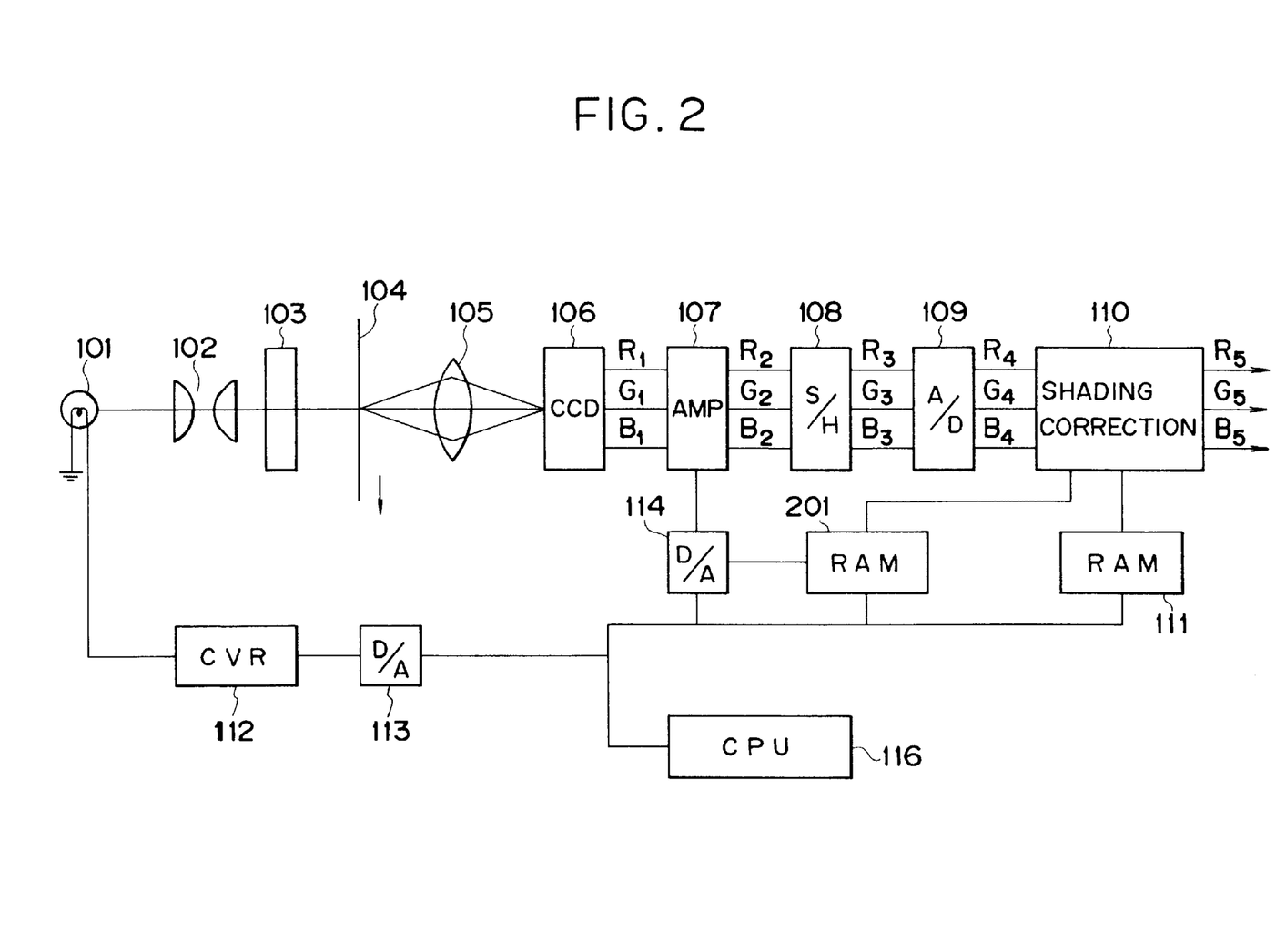
FIG. 2 is a block diagram of the second embodiment of the invention.

FIG. 2 shows the second embodiment of the invention and the same component elements as those shown in FIG. 1 are designated by the same reference numerals. In the first embodiment, the amplification factors of the color balance for the base film have been predetermined and stored in the RAM 115. When the shading correction data is read, the data in the RAM 115 is D/A converted and the amplification gains of the amplifier 107 are determined in an analog manner. In the second embodiment of the invention shown in FIG. 2, however, memory contents in an RAM 201 similar to those in the RAM 115 in FIG. 1 are given to the shading correction circuit 110. When the shading correction data is read, the RGB gains of the shading correction circuit 110 are set into the through state. In this state, the shading correction data is written into the shading RAM 111. When the image data of the color film to be processed is written, the shading correction is executed in the shading correction circuit 110 in accordance with the following equations.

$$R = \frac{r}{a_r S_r} * 255$$

$$G = \frac{g}{a_g S_g} * 255$$

$$B = \frac{b}{a_b S_b} * 255$$

Where, R, G, B: image read data (8 bits) after completion of the shading correction r, g, b: image read data $a_r$, $a_g$, $a_b$: R, G, B gains $S_r$, $S_g$, $S_b$: shading correction data A similar effect is also obtained by the above construction and, further, a digital fine adjustment can be also performed by the adjustment of $a_r$, $a_g$, and $a_b$.

Figure 6:
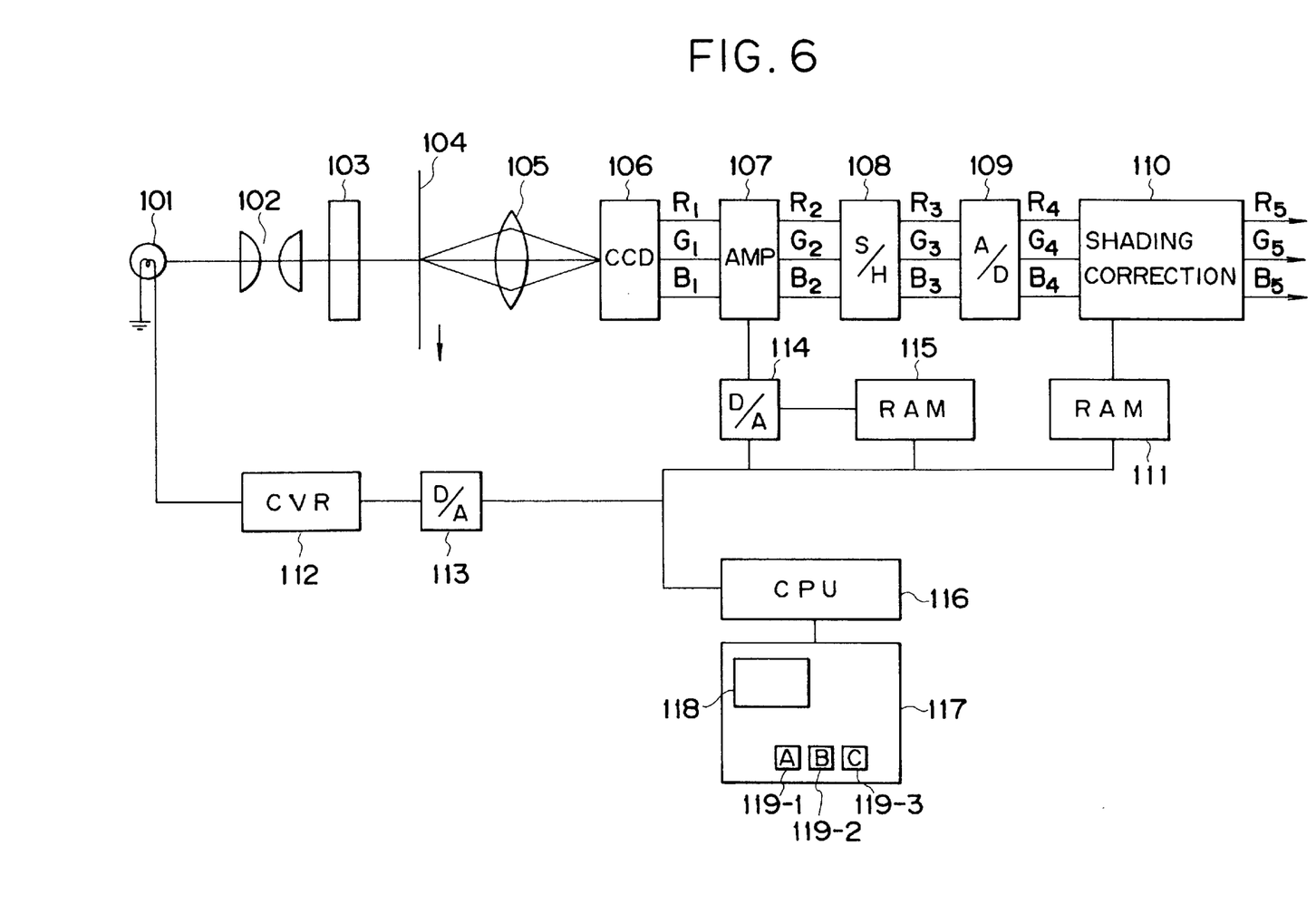
FIG. 6 is a diagram showing the third embodiment of the invention.

FIG. 6 is a diagram showing the third embodiment of the invention.

In the third embodiment, an operating section 117 has a display panel 118 and selection keys 119-1 to 119-3 to set the kind of color film.

Since the base concentration of the color film differs with every manufacturing maker of the film and with every kind of the film, a target color film to be processed is selected from a plurality of kinds of color films.

In accordance with the setting of the selection keys 119-1 to 119-3, one of a plurality of sets of amplification factors which have previously been stored in the RAM 115 are read out from the RAM 115 by the CPU and set into the amplifier 107.

The operating performance of the shading correction of different kinds of color films is improved as mentioned above.

As described above, according to the above embodiments of the invention, when the original image of the color film is read, the shading correction or the like is executed without using the necessary color base film and the color film original image can be read. In addition, since the color base film is not used, there are effects such that the bleaching of the film due to the repetitive use of the base film and the deterioration of the picture quality of the read image in association with such a bleaching in the conventional apparatus are prevented.

The present invention is not limited to the foregoing embodiments but many modifications and variations are possible within the spirit and scope of the appended claims of the invention.

What is claimed is:

1. A color image reading apparatus comprising:
    holding means for holding color negative film;
    converting means for converting light information into a plurality of color component signals by using a plurality of photoelectric converting elements;
    first memory means for storing level-adjusting data which is used for adjusting the color component signals based on a characteristic of an unexposed portion of the color negative film;
    level-adjusting means for adjusting the color component signals by using said level-adjusting data;
    second memory means for storing correction data produced from a plurality of reference color component signals which are converted by said converting means from light information produced while said holding means does not hold the color negative film and which are then adjusted by said level-adjusting means using said level-adjusting data to adjust the color component signals based on a characteristic of an unexposed portion of the color negative film; and
    correcting means for correcting color component signals converted by said converting means from light information produced while said holding means holds the color negative film by using said correction data stored in said second memory means.

2. An apparatus according to claim 1, wherein said level-adjusting means includes an amplifier for amplifying a plurality of color component signals input to said correcting means.

3. An apparatus according to claim 2, wherein the level-adjusting data stored in said first memory means control an amplification factor of said amplifier.

4. An apparatus according to claim 1, wherein said correcting means includes a shading correction circuit for correcting characteristics of said converting means.

5. An apparatus according to claim 4, wherein said shading correction circuit simultaneously executes both of a correction according to a color tone of the unexposed portion of the color negative film and correction of characteristics of said converting means.

6. An apparatus according to claim 1, wherein a plurality of sets of said level-adjusting data corresponding to a plurality of different types of color negative films are stored in said first memory means.

7. An apparatus according to claim 6, further having selecting means for selecting one of the sets in accordance with a type of the color negative film held by said holding means.

8. An apparatus according to claim 1, wherein said level-adjusting means comprises amplifier means for amplifying the plurality of color component signals and shading correction means for correcting characteristics of said converting means.

9. An apparatus according to claim 8, wherein said amplifier means amplifies the color component signals based on the first correction data when said second memory means stores the second correction data.

10. An apparatus according to claim 8, wherein said amplifier means amplifies the color component signals without using the first correction data when said second memory means stores the second correction data.

11. A color image reading apparatus comprising:
    holding means for holding color film;
    converting means for converting light information into a plurality of color component signals by using a plurality of photoelectric converting elements;
    level adjusting means for adjusting a level of each color component signal converted by said converting means;
    first memory means for storing adjustment data for each color component, the adjustment data used by said level adjusting means;
    second memory means for storing correction data produced from a plurality of reference color component signals which are converted by said converting means from light information produced while said holding means does not hold the color film and which are then adjusted by said level adjusting means based on the adjustment data stored in said first memory means; and
    correcting means for correcting color component signals converted by said converting means from light information produced while said holding means holds the color film by using said correction data stored in said second memory means.

12. An apparatus according to claim 11, wherein said level adjusting means includes an amplifier for amplifying a plurality of color component signals input to said correcting means.

13. An apparatus according to claim 12, wherein said adjustment data stored in said first memory means controls an amplification factor of said amplifier.

14. An apparatus according to claim 11, wherein said correcting means includes a shading correction circuit for correcting characteristics of said converting means.

15. An apparatus according to claim 14, wherein said shading correction circuit simultaneously executes both a correction according to a color tone of the unexposed portion of the color film and a correction of characteristics of said converting means.

16. An apparatus according to claim 11, wherein a plurality of sets of said adjustment data corresponding to a plurality of different types of color films are stored in said first memory means.

17. An apparatus according to claim 16, further comprising selecting means for selecting one of the sets in accordance with a type of the color film held by said holding means.

18. An apparatus according to claim 11, wherein said correcting means comprises amplifier means for amplifying the plurality of color component signals and shading correction means for correcting characteristics of said converting means.

19. An apparatus according to claim 18, wherein said amplifier means amplifies the color component signals based on said adjustment data when said second memory means stores said correction data.

20. An apparatus according to claim 18, wherein said amplifier means amplifies the color component signals without using said adjustment data when said second memory means stores said correction data.

21. A color image reading apparatus comprising:
    holding means for holding color negative film;

converting means for converting light information into a plurality of color component signals by using a plurality of photoelectric converting elements;

adjusting means for adjusting the color component signals converted by said converting means;

first memory means for storing adjusting data which is used for adjusting the color component signals based on a characteristic of an unexposed portion of the color negative film;

correcting means for correcting the color component signals output from said adjusting means for each of the plurality of photoelectric converting elements while said holding means holds the color negative film;

second memory means for storing correction data produced from a plurality of reference color component signals which are converted from light information, the correction data used by said correcting means; and control means for controlling the adjustment of the color component signals by said adjusting means based on whether the apparatus is producing the correction data or whether the apparatus is reading the color negative film.

22. An image reading system comprising:

holding means for holding a film;

converting means for converting light information into a plurality of color component signals by using a plurality of photoelectric converting elements;

color balance adjusting means for adjusting color balance of the plurality of color component signals converted by said converting means;

memory means for storing adjustment data, the adjustment data for use by said color balance adjusting means; and correcting means for correcting, by using shading correction data, the plurality of color component signals converted by said converting means from light information produced while said holding means holds the film, the shading correction data being produced from a plurality of reference color component signals which are converted by said converting means from light information produced while said holding means does not hold the film.

23. A system according to claim 22, wherein said color balance adjusting means includes an amplifier for amplifying the plurality of color component signals.

24. A system according to claim 23, wherein said adjustment data stored in said memory means controls an amplification factor of said amplifier.

25. A system according to claim 22, wherein said correcting means includes a shading correction circuit for correcting characteristics of said converting means.

26. A system according to claim 22, wherein a plurality of sets of said adjustment data corresponding to a plurality of different types of color films are stored in said memory means.

27. A system according to claim 26, further comprising selecting means for selecting one of the sets in accordance with a type of the film held by said holding means.

28. A system according to claim 22, wherein said correcting means comprises amplifier means for amplifying the plurality of color component signals and shading correction means for correcting characteristics of said converting means.

* * * * *